United States Patent [19]
Taylor

[11] Patent Number: 4,953,504
[45] Date of Patent: Sep. 4, 1990

[54] ANIMAL FEEDER
[75] Inventor: Ian A. Taylor, Quincy, Ill.
[73] Assignee: Moorman Manufacturing Company, Quincy, Ill.
[21] Appl. No.: 468,642
[22] Filed: Jan. 23, 1990
[51] Int. Cl.⁵ .................................................. A01K 5/01
[52] U.S. Cl. ...................................... 119/54; 119/53.5
[58] Field of Search ....................... 119/54, 53.5, 52.1, 119/75

[56] References Cited

U.S. PATENT DOCUMENTS

| | | | |
|---|---|---|---|
| 349,843 | 9/1886 | Gushart | 119/53.5 |
| 1,326,002 | 12/1919 | Soseman | 119/53.5 |
| 4,825,811 | 5/1989 | O'Kelley | 119/51.5 |

FOREIGN PATENT DOCUMENTS 134973  10/1949  Australia .

Primary Examiner—John Weiss
Attorney, Agent, or Firm—Lockwood, Alex, FitzGibbon & Cummings

[57] ABSTRACT

An animal feeder for individual animal self-regulated release of free flowing particulate animal feed (e.g. meal or pellets) from an elevated feed supply hopper into a subjacent feed trough. The hopper has a feed outlet in the form of a slot extending longitudinally between opposite sides of the feeder and with its width defined between the bottom edge of an inclined hopper wall and the hopper rear wall. The slot is normally closed by a plurality of tubular segments or rings resting in end-to-end elongated tube-forming relationship on the upper side of the slot. A rod (solid or hollow) rests loosely within the tubular segments and extends from one end segment to the opposite end segment. A horizontal segment restraining member or bar is mounted above the segments which limits excessive lifting of the segments. When mounted so as to be vertically adjustable the restraining member or bar can be used to regulate the degree to which an animal can lift a tubular segment and thereby control the size of the feed release opening. The loose rod and restraining member cooperate to maintain the end-to-end relationship of the tubular segments even though individual segments or pairs of adjacent segments may be temporarily raised out of end-to-end alignment.

8 Claims, 5 Drawing Sheets

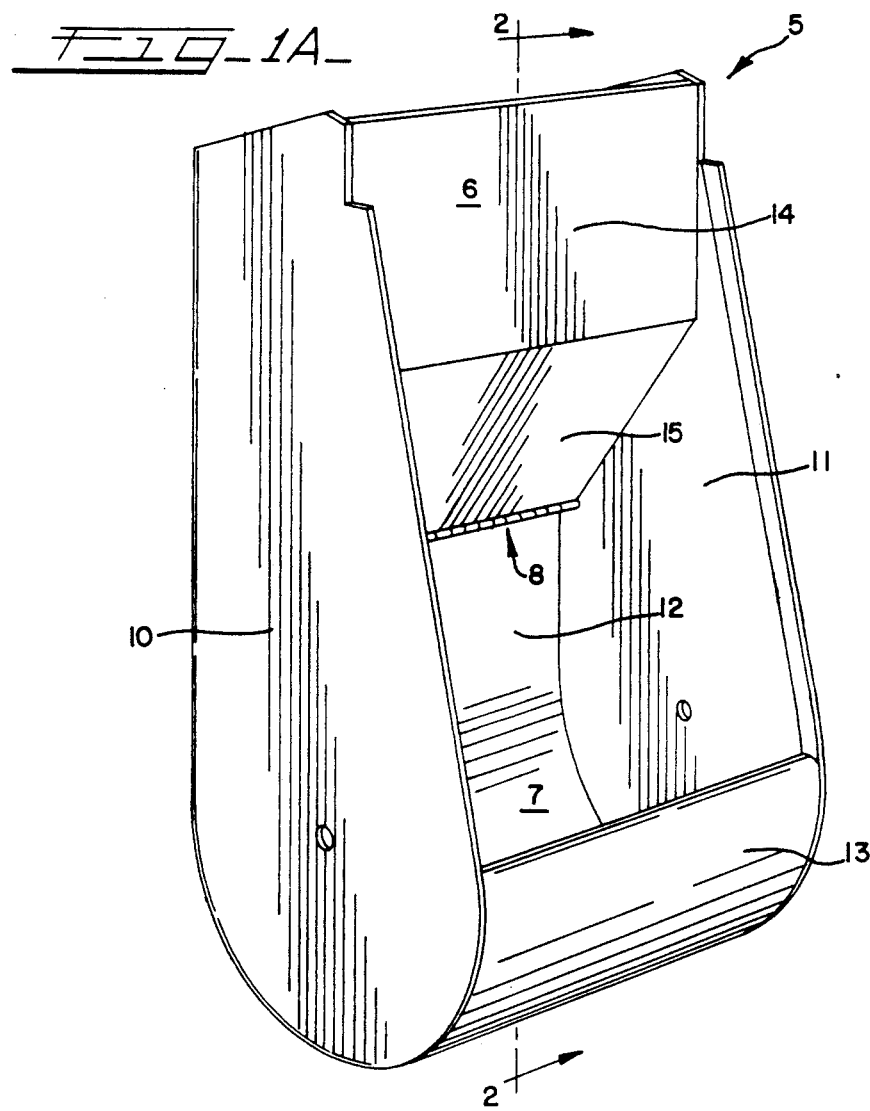
FIG_1A_
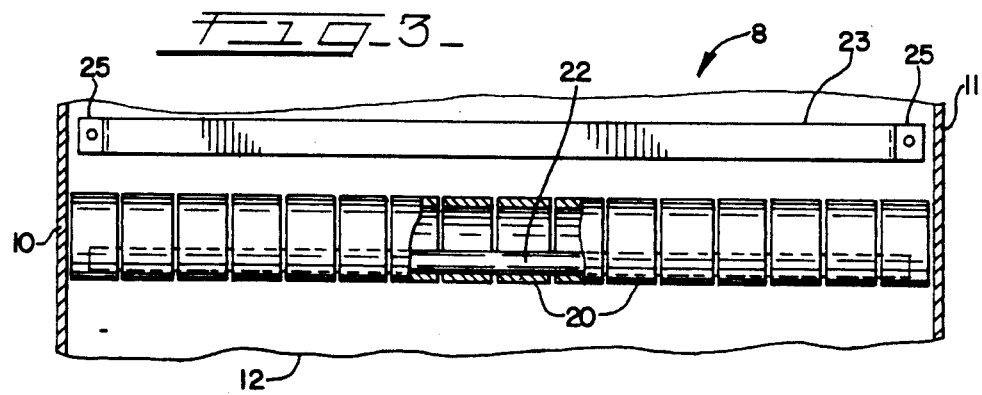
FIG_3_

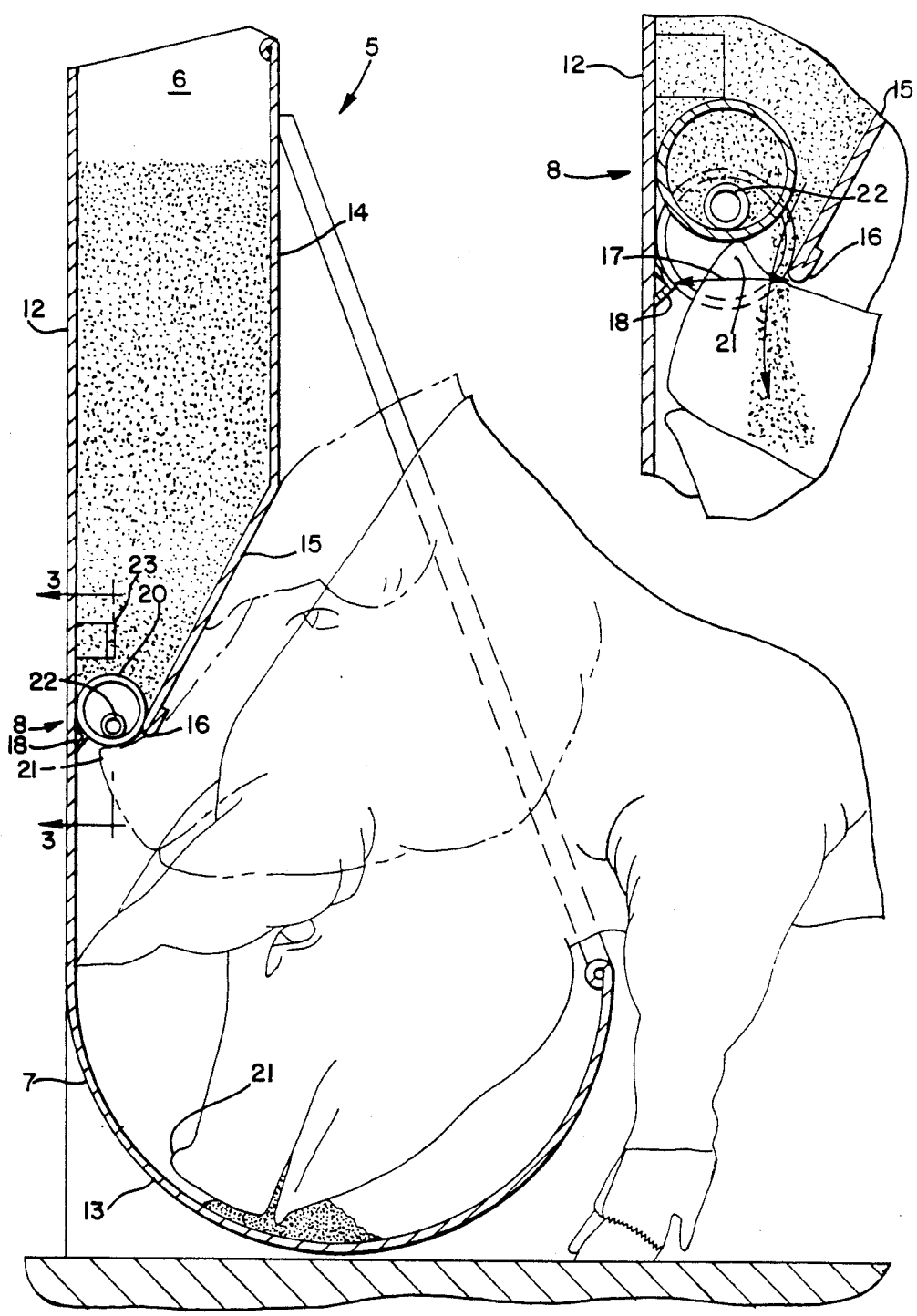

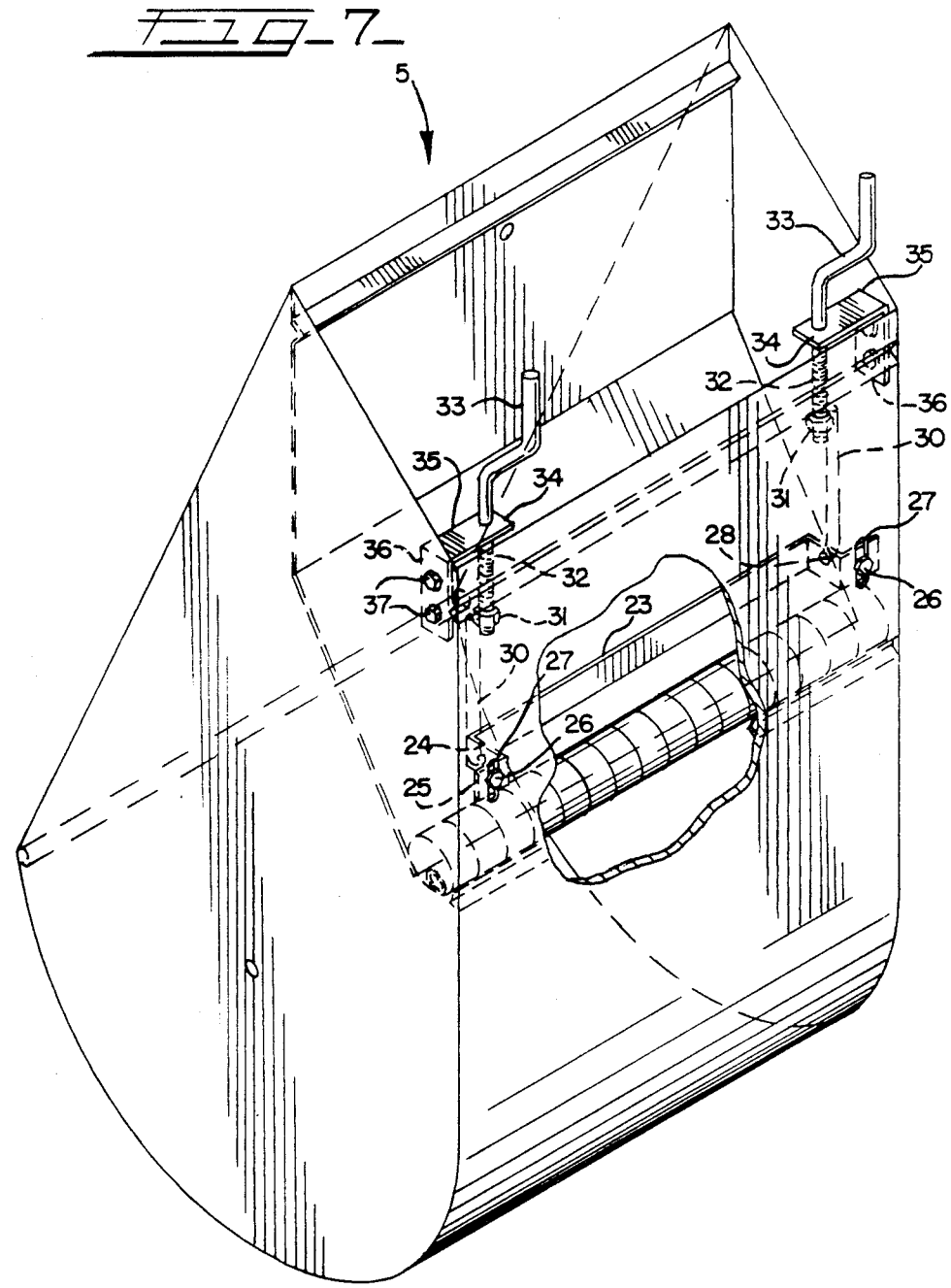
FIG_7

ANIMAL FEEDER

FIELD OF THE INVENTION

The present invention relates generally to innovations and improvements in animal feeders for ad libitum feeding four-legged animals, primarily swine. The feeders are of the type that individual animals utilize to self-regulate the release of free flowing particulate animal feed from an elevated feed supply hopper into a subjacent feed trough. Feeders of this general type are known and are shown and described for example in application Ser. No. 07/244,031 of Stanley E. Curtis and Ian A. Taylor filed Sept. 14, 1988, Charles O'Kelley U.S. Pat. No. 4,825,811 dated May 2, 1989 and Australian patent No. 134,973 dated Oct. 21, 1949. In particular, the present invention is an improvement on the animal feeder shown and described in the Curtis and Taylor application Ser. No. 07/244,031.

The object of the invention, generally stated, is the provision of an animal feeder of the type having an elevated feed hopper with a horizontal feed outlet slot in the bottom which discharges free flowing particulate feed into a subjacent feed trough and wherein the feed outlet slot is normally closed by a plurality of tubular segments or rings arranged and resting on the upper side of the slot whereby an individual animal can engage and temporarily lift and unseat one or a pair of adjacent tubular segments so as to provide a temporary small opening through which feed may be released from the hopper by gravity into the feed trough where it can be consumed ad libitum by the animal with the feed release and consumption activities being repeated at the will of the animal.

More specifically, an object of the invention is the provision of an animal feeder of the foregoing type wherein a relatively small diameter rod (solid or tubular) extends loosely from end to end through the relatively large tubular segments and a restraining bar or rod is positioned above the tubular segments or rings so as to limit the upward movement of the segments with the loose rod and restraining member cooperating to maintain the individual segments in their end-to-end relationship even though one or several adjacent segments may be temporarily tilted or lifted a substantial distance out of alignment with the remainder of the segments.

A still further object of the invention is the provision of an animal feeder of the foregoing type wherein the restraining member is vertically adjustable so that the opening(s) through which feed is released may be controlled as to size and thereby preadjusted for feeds having different flow properties and animals in different phases of growth or with different feed requirements.

Certain other objects of the invention will become obvious to those skilled in the art in view of the following detailed description of presently preferred embodiments of the invention taken in connection with the accompanying drawings wherein:

FIG. 1A is a front perspective of the animal feeder of FIG. 1;

FIG. 2 is a vertical sectional view taken on line 2—2 of FIG. 1A showing an animal feeding;

FIG. 2A is a fragmentary view on enlarged scale of a portion of FIG. 2 showing the animal in the act of releasing feed;

FIG. 3 is a fragmentary sectional view partially broken away taken on line 3—3 of FIG. 2;

FIG. 7 is a perspective view partly broken away of a modified animal feeder embodying the invention.

Figure 1:
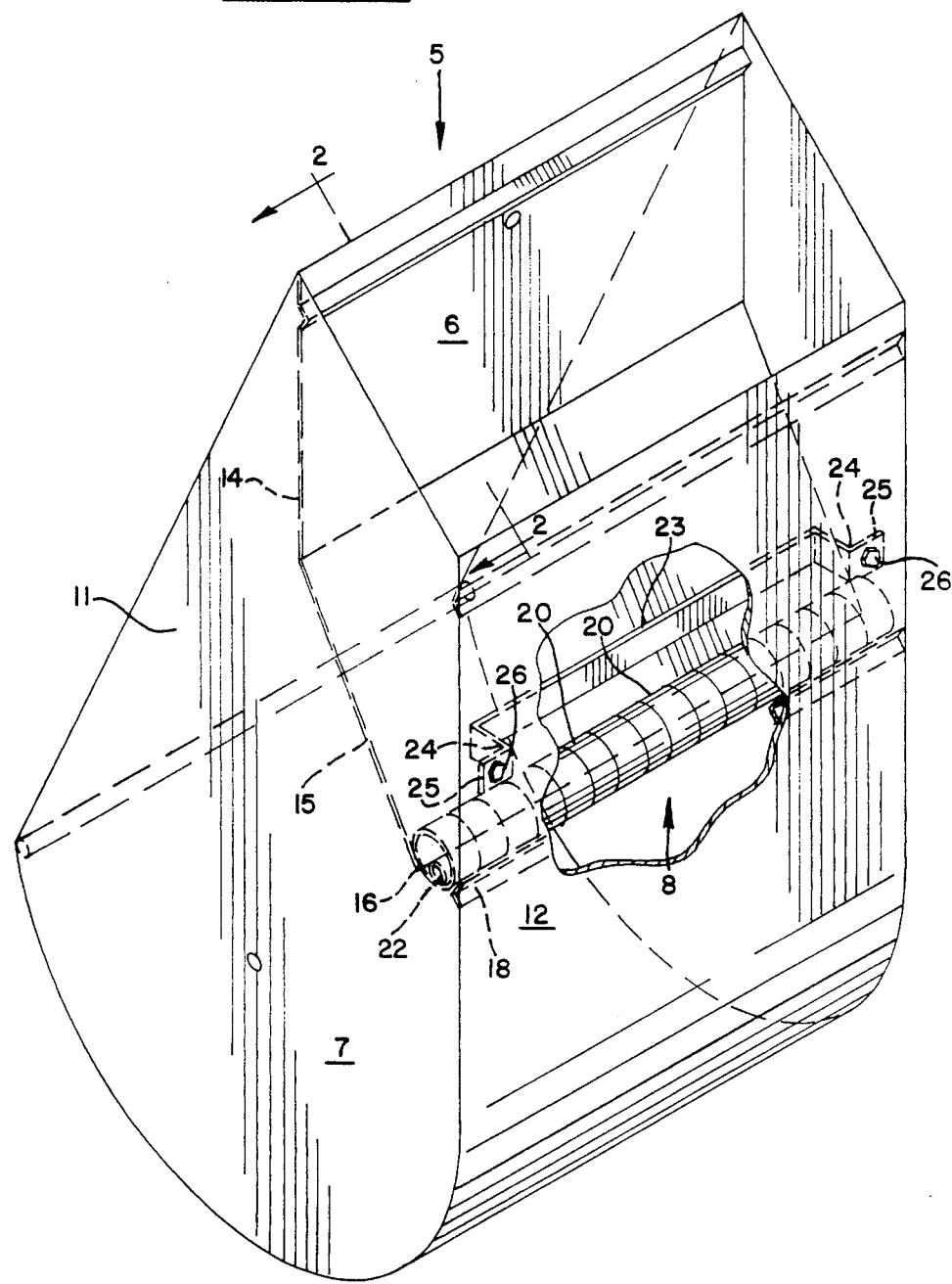
FIG. 1 is a rear perspective view, partially broken away, of an animal feeder embodying the present invention.

In FIGS. 1, 1A, 2 and 4, an animal feeder particularly suited for feeding swine, is indicated generally at 5. The feeder 5 includes an elevated feed hopper indicated generally at 6 and subjacent feed trough indicated generally at 7. In FIG. 2, a sow is shown eating feed from the trough 7 which it has previously released from the hopper 6 by self-actuating a feed release mechanism indicated generally at 8.

The body of the feeder 5 is formed of a suitable sheet material such as stainless steel or the body may be molded in one or several parts from a suitable plastic which has suitable physical properties such as environmentally stabilized polyethylene, polypropylene, polyester or polycarbonate thermoplastic resins. The body of the feeder 5 comprises end or side walls 10 and 11 interconnected by a vertical rear wall 12 and a concave trough formation 13. Preferably the rear wall 12 and trough formation 13 are integrally formed from one piece when the body is fabricated from sheet material such as stainless steel.

The hopper 6 is defined by portions of the side or end walls 10 or 11, the upper portion of the vertical rear wall 12 and a front wall having an upper vertical portion 14 and a lower rearwardly inclined portion 15 (FIG. 2). Preferably the sections 14 and 15 are integrally formed when the front wall is formed from sheet material.

The bottom edge of the hopper wall portion 15 is indicated at 16 and is preferably seamed so as not to be sharp or raw. It is spaced from the rear wall 12 so as to define therebetween a horizontal feed outlet slot 17 (FIG. 2A). Preferably the rear wall 12 is provided with an elongated indentation 18 (FIGS. 1, 2 and 2A) at an elevation approximately corresponding to the bottom edge 16 of the hopper wall inclined portion 15. The V-indentation provides a seating surface and adds rigidity to the rear wall 12.

Figure 4:
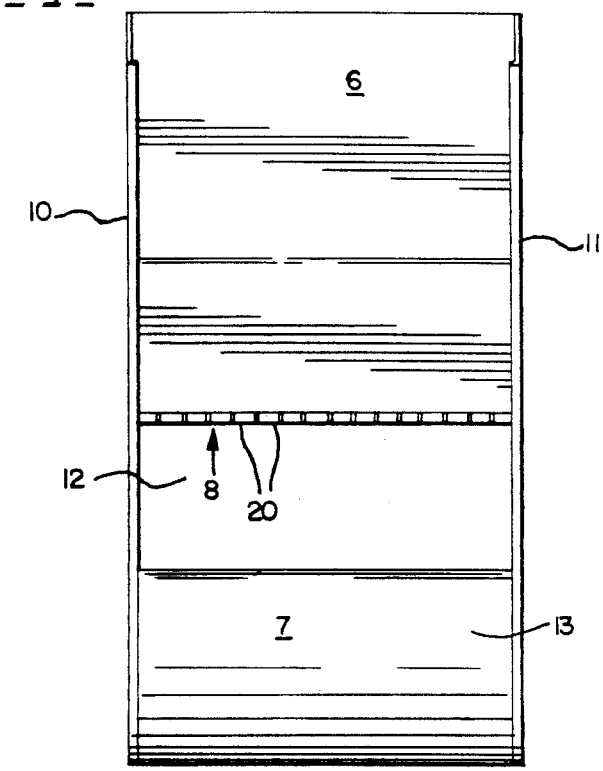
FIG. 4 is a front elevational view of the animal feeder as shown in FIGS. 1A and 2.
Figure 5:
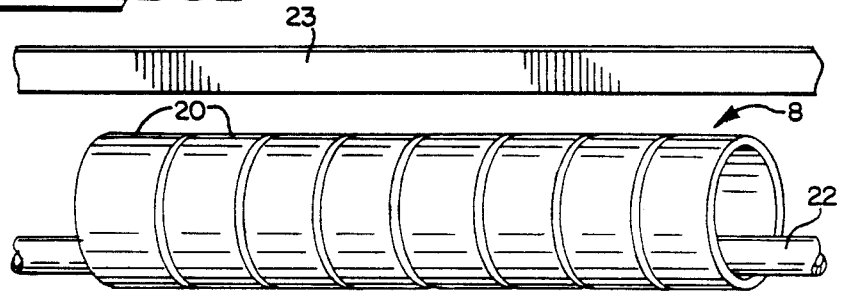
FIG. 5 is a perspective view showing the feed release mechanism of the animal feeder of FIGS. 1-4 or full closing in its inactive condition.
Figure 6:
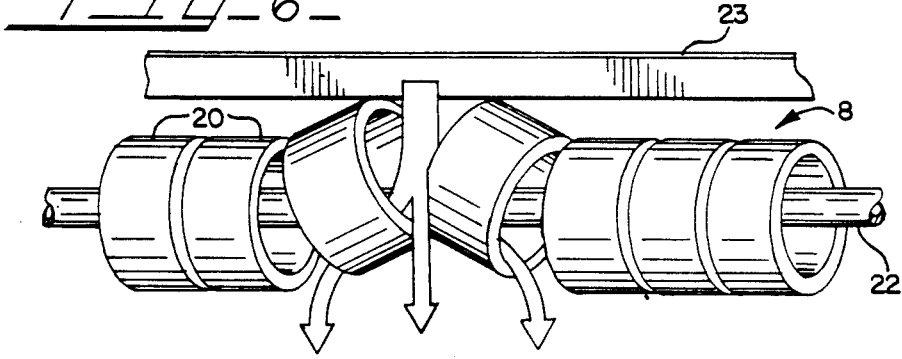
FIG. 6 is a view corresponding to FIG. 5 illustrating the feed release mechanism in one open condition.

The width of the slot 17 is such that if it remained open the feed within the hopper 6 would readily flow by gravity into the subjacent trough 7. The animal actuated feed release mechanism 8 prevents such free release or discharge of the feed material from the hopper 6. The mechanism 8 comprises a plurality of tubular segments or rings 20—20 of such diameter as to rest on top of the slot 17 and be supported between the bottom or lower edge 16 and the opposing V-indentation 18. When at rest, i.e., not in operation and functioning to release feed, the segments 20—20 are disposed in end-to-end tube-forming relationship extending between the side walls 10 and 11 as shown in FIGS. 1, 3 and 4. It will be observed from FIGS. 2 and 2A that sufficient portions of the undersides of the tubular segments or rings 20 protrude below the elongated slot 17 so as to be engagable by the snout 21 of the feeding animal thereby dislodging and lifting one or an adjacent pair of the segments 20 as illustrated in FIG. 6. When one or more of the segments 20 are raised, an opening or flow path(s) is provided for feed in the hopper 6 to discharge by gravity into the trough 7. Normally, as soon as the animal has thus released and secured for itself a relatively small quantity of the feed from the hopper it will proceed to consume the feed before acting to release an additional quantity. When the animal disengages the one or more of the tubular segments 20 that it has temporarily lifted they will by gravity and weight of the feed resume their normal end-to-end aligned relationship as shown in FIGS. 1 and 5 thereby shutting off further flow or release of feed from the hopper 6.

Means are incorporated in the feeder 5 to prevent a self-feeding animal from lifting or displacing one or more of the tubular segments 20 an excessive amount so that it or they will not return to their normal slot-closing end-to-end relationship. This means is provided for the feeder 5 in part by a relatively small diameter rod 22 which fits loosely within the segments 20 and normally rests on the bottoms thereof as shown in FIGS. 1, 2, 3, and 5.

While the loose fitting rod 22 will not by itself suffice to prevent excessive displacement of a tubular segment 20 or a pair of adjacent tubular segments 20 it cooperates to do so with a horizontal restraining bar or member 23 mounted above the tubular segments 20. The bar or member 23 may take the form of a strip of rigid material such as stainless steel which is bent or formed at its opposite ends so as to provide L-shaped brackets 24 (FIG. 1) which have outurned flanges 25—25 which fit flatwise against the inside of the rear wall 12 and are secured in place such as by screws 26—26 extending through the rear wall 12. It will be seen that the inwardly projecting legs of the brackets 24 are of such length as to place the bottom horizontal edge of the bar or member 23 directly over the crests of the tubular segments 20 although this placement or orientation does not have to be exact.

The action of the restraining member or bar 23 in preventing excessive lifting of any segment 20 may not by itself necessarily result in a lifted segment 20 returning to its proper end-to-end relationship with the other segments 20. However, the restraining member or bar 23 in cooperation with the loose fitting rod 22 will together not only prevent undue lifting or dislodgment of a segment or segments but will also result in the return of the lifted segments to their proper end-to-end relationship in the assembly.

In addition to preventing excessive lifting or dislodgment of one or more of the tubular segments or rings 20 by an animal, the restraining member or bar 23 can be utilized to regulate or control the feed drop or feed release to less than maximum. By providing convenient vertical adjustment of the restraining bar or member 23 such control can be conveniently obtained. One means for accomplishing such vertical adjustment or control is shown in the embodiment of the invention shown in FIG. 7. The component parts of the animal feeder indicated generally at 5' in FIG. 7 which corresponds to the component parts of the animal feeder 5 in FIGS. 1-6 are given corresponding reference numerals. The screws 26 which serve to attach the ears 25 of the restraining member 23 to the rear wall 12 extend through vertical slots 27—27 in the rear wall thereby permitting vertical adjustment of the restraining member 23. The inwardly extending legs of the brackets 24 are provided with openings for receiving the laterally extending hook ends 28 formed on the bottom ends of vertical support rods 30—30. The upper end of each rod 30 is inwardly bent and provided by welding or otherwise with a nut 31 into which is threaded the lower end of a screw 32 the upper end of which has a crank formation 33 extending above the top of the hopper 6. The adjustment screws 32 are rotatably mounted on the inturned horizontal legs 34 of brackets 35—35 the vertical legs 36 of which are secured against the inner sides of the sidewalls 10 and 11 by pairs of anchoring screws 37—37.

It will be seen that by appropriate rotation of the crank handles 33 the desired amount of vertical adjustment of the restraining member of bar 23 to the extent permitted by the slots 27 can be obtained. This vertical adjustment makes it particularly convenient to use the feeder 5' for feeds having appreciably different flow rates and animals having substantially different feeding requirements such, for example, as animals in different phases of growth. Thus, for slower flow or more difficult access the restraining member or bar 23 will be placed in a lowered position whereas it will be placed in a higher position for faster flow or easier access. Thus, the vertical adjustment of the restraining bar or member 23 can be utilized when it is desired to make it more or less difficult for animals feeding ad libitum to secure the release of feed from the feed hopper. Still further, different kinds of animal feed may flow through openings provided by the raised tubular segments 20 at appreciably different rates and vertical adjustment of the restraining member or bar 23 may be relied upon to accommodate the feed flow rates as may be desired.

What is claimed is:

1. In an animal feeder for individual animal self-regulated release of free flowing particulate animal feed from an elevated feed supply hopper into a subjacent feed trough and comprising a generally vertical rear wall, opposed side walls, a feed trough extending between said sidewalls and joined at its rear to the bottom portion of said rear wall, an at least in part inclined hopper wall extending between said sidewalls with its bottom edge forming in cooperation with the opposing juxtaposed portion of said rear wall a generally horizontal elongated feed outlet slot which extends longitudinally between said sidewalls, and animal actuatable slot closing means, the improvement wherein said slot closing means comprises a plurality of relatively short tubular segments within said hopper and resting in end-to-end slot-closing and elongated tube-forming relationship in said elongated slot, a rod resting loosely within said tubular segments and extending between the opposing end segments, and a generally horizontal segment restraining member mounted above said tubular segments in position to limit lifting of said segments, said rod and restraining member cooperating to maintain said tubular segments in their said end-to-end relationship.

2. The animal feeder called for in claim 1 wherein said tubular segments are cylindrical and the distances from the bottom portion of said restraining member engageable by said tubular segments on lifting to the nearest portions of said rear wall and hopper wall are less than the outer diameters of said tubular segments.

3. The animal feeder called for in claim 1 wherein said tubular segments are cylindrical and the outer diameter of said rod is substantially smaller than the interior diameters of said segments.

4. The animal feeder called for in claim 1 wherein said segment restraining member is vertically adjustable.

5. The animal feeder called for in claim 4 said segment restraining member has L-shaped support brackets on opposite ends which have laterally extending apertured legs which flatwise engage said rear wall, said rear wall has vertically extending slot openings which overlie the apertures in said apertured bracket legs, and fasteners extend through said slot openings and said apertures which upon tightening secure said restraining member in a fixed position.

6. The animal feeder called for in claim 5 wherein adjustable elevating means operatively interconnect opposite ends of said restraining member to higher fixed portions of the interior of said hopper.

7. The animal feeder called for in claim 6 wherein said elevating means comprise a pair of suspension rods with lower ends connected to said L-shaped brackets and upper ends having laterally extending nuts, a pair of crank screws the lower ends of which have threaded engagement with said nuts and upper portions of which are rotatably supported on legs of a second pair of L-shaped brackets secured to the upper portions of said hopper end walls.

8. The animal feeder of claim 1 wherein the bottom of the hopper portion of said vertical rear wall has a horizontal inwardly extending V-shaped formation extending between said sidewalls at an elevation approximately even with the elevation of said bottom edge of said at least in part inclined hopper wall and serving as a support ledge on the interior of said rear wall for said tubular segments.

* * * * *